United States Patent [19]

Halpert et al.

[11] Patent Number: 5,035,725
[45] Date of Patent: Jul. 30, 1991

[54] COMPOSITE MONOLITHIC FREE ABRASIVE GRINDING LAP AND A METHOD OF MAKING THE SAME

[75] Inventors: Pinke Halpert, West Palm Beach; Royce Platt, Okeechobee, both of Fla.

[73] Assignee: United Technologies Corporation, Hartford, Conn.

[21] Appl. No.: 624,787

[22] Filed: Dec. 4, 1990

Related U.S. Application Data

[63] Continuation-in-part of Ser. No. 320,204, Mar. 7, 1989, Pat. No. 4,975,225.

[51] Int. Cl.$^5$ .......................... B24D 3/08; B24D 3/16
[52] U.S. Cl. ...................................... 51/293; 51/296; 51/308; 51/309; 264/28
[58] Field of Search ................. 51/293, 296, 308, 309; 264/28

[56] References Cited

U.S. PATENT DOCUMENTS

| 4,341,725 | 7/1982 | Weaver et al. | 264/86 |
| 4,428,895 | 1/1984 | Blasch et al. | 264/28 |
| 4,526,734 | 7/1985 | Enomoto | 264/28 |
| 4,975,225 | 12/1990 | Vivaldi et al. | 264/56 |
| 4,992,220 | 2/1991 | Neri et al. | 264/28 |

Primary Examiner—Karl Group
Assistant Examiner—Deborah Jones
Attorney, Agent, or Firm—Peter R. Ruzek

[57] ABSTRACT

A composite yet monolithic, free abrasive grinding lap includes a sintered porous matrix of ceramic or metal material and a quantity of silicon, substantially completely filling the pores of the sintered porous matrix preform at least throughout an effective region of the lap that is to come in contact with a workpiece to be acted upon by the lap. The free abrasive grinding lap is made by first slip-casting a preform, then freezing and freeze-drying the same, followed by lightly sintering the dry preform into a porous matrix preform, bringing the temperature of the preform to above the melting point of silicon, and filling the pores with molten silicon.

3 Claims, 1 Drawing Sheet

COMPOSITE MONOLITHIC FREE ABRASIVE GRINDING LAP AND A METHOD OF MAKING THE SAME

CROSS-REFERENCE TO RELATED APPLICATIONS

The present application is a continuation-in-part application of a commonly assigned patent application Ser. No. 07/320,204, filed Mar. 7, 1989, now U.S. Pat. No. 4,975,225.

DESCRIPTION

1. Technical Field

The present invention relates to the manufacture of ceramic articles in general and more particularly to the manufacture of grinding and/or polishing laps and similar tools.

2. Background Art

There are already known various constructions of laps for use in free abrasive grinding, among them such especially suited for free abrasive grinding of mirrors, lenses and similar optical components. Because of the relative delicacy of the components of this kind and the need to achieve as high a degree of accuracy as possible, both in terms of surface quality and figure conformity, such laps have to possess certain characteristics that greatly affect the material removal process from the workpiece and that have to be properly chosen for the respective application. One of such characteristics is the stiffness of the lap or a similar grinding tool. The stiffness affects the depth of penetration of the abrasive particles into the lap or tool and, correspondingly, the depths of the cuts made thereby in the workpiece. High stiffness results in deeper cuts with faster material removal, but also in greater damage, especially when the workpiece is of a brittle material. Stiffness of the tool also affects the figure control achieved during the material removal operation in that stiffer laps control the figure better than more compliant ones. Another one of the important characteristics is the thermal conductivity of the tool in that it affects the surface temperature of the workpiece which, in turn, affects the figure control and possibly even the chemistry of the material removal process. Yet another important characteristic is the hardness of the lap or similar tool in that it determines the extent to which abrasive particles adhere to the tool.

Experience has shown that it is very difficult if not impossible to satisfy all of the requirements for all phases of a respective free abrasive grinding operation in a particular application and/or for all or a multitude of applications with a monolithic lap, especially since at least some of the above requirements are mutually contradictory in the sense that a change in one of the characteristics to better satisfy one of the above requirements usually has a deleterious effect on the satisfaction of another requirement. Consequently, in the past, the monolithic lap or similar tool material selection was often a matter of compromise, weighing the importance of the various requirements against each other, and selecting the tool material for best (but not ideal) performance. On the other hand, it was also attempted to approach or achieve the desired overall results by using a plurality of laps of different materials in such a manner that different laps were used during different phases of the respective free grinding operation and/or for different applications. This, of course, brought about a situation that was disadvantageous in the respect that it resulted in the needs for making or purchasing, and for storing, the aforementioned plurality of different laps, for carefully selecting and locating the lap to be used during the particular grinding operation phase or in the particular application, and for replacing the respective previously used laps with the new ones. Typically, the materials of choice for such laps for use in free abrasive grinding of optical components have been various relatively hard materials, such as various grades of glass, ceramic tiles and metals exhibiting various degrees of rigidity. In some instances, the hard material body has an increased overall rigidity imposed thereon by being mounted in or on a high-rigidity support or backing element.

On the other hand, it is known to mold refractory and metal shapes by slip-casting. So, for instance, the U.S. Pat. No. 4,341,725, issued on July 27, 1982, discloses a slip-casting process wherein a nucleating agent is added to the slip prior to the casting and to the subsequent freezing of the cast preform in order to keep the sizes of ice crystals forming in the cast preform during the freezing of the latter at a level sufficiently low to avoid structural damage to the preform that would result if the sizes of the ice crystals were excessive. The only specific use that this patent describes for its method is in the context of making a simple tube of constant inner and outer diameters. Even though this patent mentions that other elements could also be produced by resorting to the same process, it should be evident that the sintered final products obtained by the process as disclosed in this patent, regardless of their shapes, would be totally unsuited for use as free abrasive grinding tools for use in high-precision applications, such as those encountered with optical components, if for no other reasons, then for their relatively high brittleness.

Accordingly, it is the general object of the invention to avoid the disadvantages of the prior art.

More particularly, it is an object of the present invention to present a method of making relatively sturdy grinding tools, especially free abrasive laps, which method does not possess the disadvantages of the prior art methods of this type.

Still another object of the present invention is so to develop the method of the above type as to improve the extent to which the tools made thereby satisfy the requirements placed on them.

It is yet another object of the present invention to devise a method of above type which results in grinding or polishing tools that are rigid enough, both locally and overall, to achieve excellent figure control of the workpieces acted upon by such tools at relatively high material removal speeds.

A concomitant object of the present invention is to provide a versatile grinding tool that has such characteristic properties as to satisfy the requirements placed on it better than previously proposed tools of this type throughout a wide range of operating conditions.

DISCLOSURE OF THE INVENTION

In keeping with these objects and others which will become apparent hereafter, one feature of the present invention resides in a composite yet monolithic free abrasive grinding lap that includes a sintered porous matrix of ceramic or metal material and a quantity of silicon substantially completely filling the pores of the sintered porous matrix preform at least throughout an effective region of the lap that is to come in contact with a workpiece to be acted upon by the lap. According to another apsect of the present invention, the above lap is manufactured by first forming an initial preform by filling a mold cavity with a dense slip consisting of ceramic or metal particles in mixture with a liquid medium, then freezing the initial preform and freeze-drying the same to remove the liquid medium therefrom, followed by sintering the thus obtained dry preform only to such an extent that the larger ones of the particles are fused together but leave interconnected pores therebetween, and converting the thus obtained porous matrix preform into the lap by bringing the porous matrix preform to a temperature above the melting point of silicon, and contacting the porous matrix preform with a quantity of molten silicon in such a manner that such molten silicon penetrates into the pores of the porous matrix preform at least to an extent needed to substantially completely fill the pores of an effective region of the lap that is to come in contact with a workpiece to be acted upon by the lap.

BRIEF DESCRIPTION OF THE DRAWING

The present invention will be described in more detail below with reference to the accompanying drawing in which.

BEST MODE FOR CARRYING OUT THE INVENTION

Figure 1:
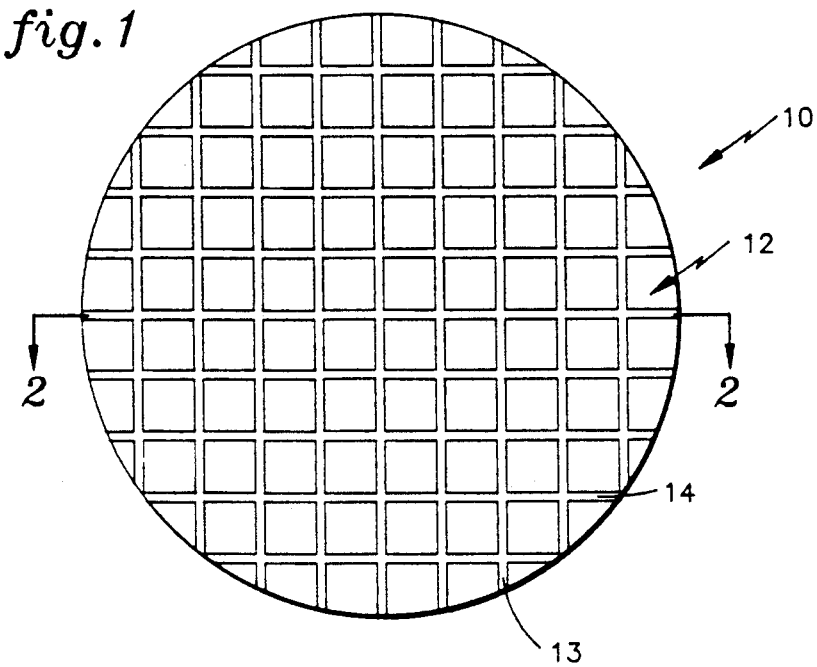
FIG. 1 is a plan view of a free abrasive lap in accordance with the present invention showing an effective region of the lap.

Referring now to the drawing in detail, it may be seen that the reference numeral 10 has been used therein to identify a free abrasive grinding lap of the present invention in its entirety. The lap 10 is shown to have a configuration of a circular disk. As will become apparent from a comparison of FIGS. 1 and 2, the lap 10 as illustrated is provided, at a region 11 of its exposed major surface 12 that faces the observer in FIG. 1 of the drawing, with two orthogonal arrays of substantially equidistant grooves 13 and 14 which intersect each other and penetrate only to a certain depth, which corresponds to that of the region 11, below the exposed major surface 12 to thus subdivide the region 11 into a multitude of raised portions or mesas 15 of substantially square outlines. As shown in particular in FIG. 2 of the drawing, the grooves 13 and 14 subdivide the exposed major surface 12 into a multitude of raised portions or mesas 15 of substantially square outlines. As shown in particular in FIG. 2 of the drawing, the grooves 13 and 14 subdivide the exposed major surface 12 into respective exposed surfaces 16 of the mesas 15 which face a respective workpiece 20 to be polished or ground when lap 10 is in its position of use.

Having so described the depicted configuration of the lap 10, the internal structure thereof, and a currently preferred method by which such internal structure is obtained, will now be discussed first in general terms with particular reference to FIG. 3 of the drawing.

As a first step, a "green" preform of the lap 10 is produced by slip casting, of which an example is disclosed in the above-mentioned U.S. patent to which reference may be had for further details of the slip casting process as such. The expression "slip casting" is being used herein to indicate a process in which a pourable slip consisting of metal, ceramic, or carbon powders or mixtures of such powders and a liquid (usually water) is poured in a non-absorbent mold, the mixture is frozen, removed from the mold and eventually freeze-dried to obtain a "green-state" body ready for firing.

The powders contained in the slip used in the performance of the method of the present invention preferably consist of larger particles 17 and smaller particles 18 in intimate mixture with one another. The "green" preform obtained from the slip-casting process as described so far is then lightly sintered, that is, sintered only to such an extent that the smaller particles 18 melt and connect the larger particles 17 with one another to form a relatively stable, yet still quite brittle, porous matrix of the kind illustrated in FIG. 3. After the thus sintered preform or matrix body of the lap 10 is obtained, it is contacted with a pore-filling material 19 that is relatively soft or compliant with respect to the matrix material at all temperatures encountered at the region 11 during the use of the lap 10, in such a manner that the pore-filling material 19 penetrates or wicks into the pores or interstices present between the sintered particles 17 and 18, at least to such an extent as to permeate the region 11 but preferably to substantially completely fill the pores or interstices throughout the sintered preform, thus converting such preform into the lap 10.

The grooves 13 and 14 may be provided in the "green" preform during the slip-casting process, for instance as a result of the presence of ridges or ribs in the casting mold that penetrate into the internal space of the mold. However, the grooves 13 and 14 can also be formed at any later stage, such as after the sintering or even later, by resorting to a material removal operation, such as milling. Subsequently to the conversion of the sintered preform into the lap 10, the region 11 is machined to remove material from the mesas 15 and thus to form their exposed surfaces 16, mainly to give the exposed major surface 12 of the lap 10 its desired, such as planar, configuration and also to improve the surface quality of the exposed surfaces 16 of the mesas 15.

EXAMPLE

A silicon carbide free abrasive lap of the type shown in FIG. 1 was formed as follows:

A batch of casting slip was prepared by mixing the following materials in the quantities shown, and rolling in a jar mill for for about 27 hours:

| | |
|---|---:|
| Silicon Carbide powder (F-320) | 5,773.8 g |
| Silicon Carbide powder (−1.0 μm) | 4,220.0 g |
| Water | 1,313.7 g |
| Sodium Silicate | 34.8 g |
| Dimethyl Sulfoxide | 205.3 g |

The casting slip prepared as described above was introduced into a mold cavity of an assembled multipartite mold through a feed port, and the air displaced thereby escaped from the mold cavity through an escape port. The mold and the slip were vibrated both during the fill and for 15 minutes thereafter, to free entrapped air.

The still assembled mold and its contents were placed in a refrigerated compartment stabilized at −85° C. and allowed to remain for about 30 minutes. The mold and its contents were subsequently removed from the refrigerated environment, and the mold portions were disassembled to free the frozen "green" preform. The frozen preform was then allowed to equilibrate at a temperature of −85° C. for about 1 hour.

Thereafter, the frozen casting was converted in steps into the final product or lap 10 by being first placed in a chamber which was evacuated to approximately 100 um of Hg at room temperature. The vacuum pumping was continued for nearly 16 hours when the vacuum level discernibly increased to less than 50 um of Hg, indicating that the freeze-dying (sublimation) process had been substantially completed and that the casting could be considered dry. The dried casting was lightly sintered by subjecting it to 2050° C. in a partial pressure of argon atmosphere.

The thus partially sintered porous preform was filled with silicon by exposing it to molten silicon at 1750° C. in a partial pressure of 1 mm of Hg of argon. This filling procedure involved placing the sintered preform, with its mesa region at the bottom, on a layer of silicon powder supported on a heating plate, and gradually raising the temperature of both the preform and the heating plate, and thus of the silicon powder layer, to the temperature mentioned just above, resulting in melting of the pulverulent silicon and wicking of the thus molten silicon, due to the action of capillary forces, into the pores of the sintered matrix. Depending on the amount of the silicon material present in the silicon powder layer and on the magnitude of the capillary forces (which, in turn, depends on the pore sizes), and possibly on other parameters, such as temperature, the molten silicon may rise all the way to the top of the preform, or only a part of the way; in any event, however, the above parameters are selected and/or controlled in such a manner as to assure penetration of the molten silicon at least thoughout the mesa region, this degree of penetration being sufficient for the lap to be fully functional in many applications.

In some cases, it is advantageous to preheat the sintered preform, just prior to bringing the same in contact with the silicon, to a temperature close to or even above the melting temperature of silicon; this reduces the amount of time needed to achieve the melting of the silicon powder and its subsequent penetration into the sintered matrix in the protective atmoshpehere environment. In either case, after the penetration of silicon into the preform is completed, the thus obtained lap 10 is allowed or caused to cool, resulting in the solidification of the silicon 19 in the pores of the sintered silicon carbide matrix 17, 18, whereafter the region 11 can be ground to remove material from the surfaces 16 of the mesas 15 and thus to improve the quality of these surfaces 16.

Figure 2:
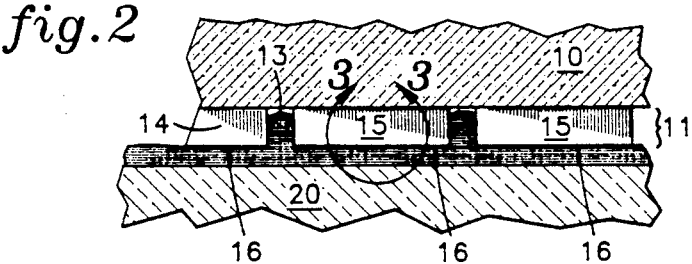
FIG. 2 is a cross-sectional somewhat enlarged view of a fragment of the free abrasive lap taken along line 2—2 of FIG. 1, in juxtaposition with a portion of a workpiece being acted upon by the lap.
Figure 3:
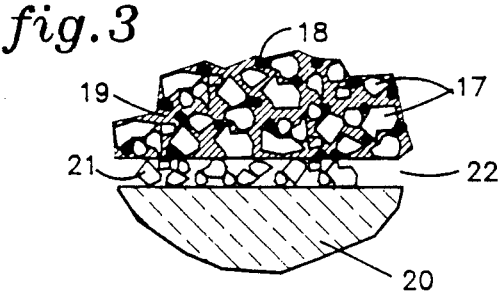
FIG. 3 is a further enlarged view showing a detail 3—3 of FIG. 2 and especially the internal structure of the effective region of the free abrasive lap.

As a comparison of FIGS. 2 and 3 of the drawing will reveal, the region 11 of the lap is brought into contact, during the actual grinding operation, with a layer 22 of abrasive particles or grit 21 which are supported, either by themselves or in mixture with or suspension in a carrier medium such as a cooling medium or paste, on the surface of the workpiece 20 that is to be acted upon. The pressure exerted by the lap 10 on the layer 22 containing or consisting of the abrasive particles 21 causes such particles 21 to become displaced as the lap 10 moves along the workpiece 20, as a result of which the abrasive particles 21 abrade the material of the workpiece 20 from the surface of the workpice that faces the region 11. The pressure exerted during the use of the lap 10 and/or the size of the particles 21, are then determinative of the depth of penetration of the embedded abrasive particles 21 into the workpiece 20, and thus of the achieved surface quality of the latter.

The resultant article 10 was a composite yet, in effect, monolithic, relatively high stiffness structure that, however, because of the presence of the relatively pliable pore-filling material, namely silicon, at least in the mesa region 11 of the lap 10, not only has been rid of the deleterious effects of the original brittleness of the sintered porous preform but also has become beteer able to cooperate with various sizes of the abrasive particles 21 to achieve the desired degree of abrasion during each grinding pass or phase. Moreover, the thus obtained lap 10 presents an almost ideal combination of the advantageous properties of the two materials constituting the same, that is, the high stiffness and high thermal conductivity of the silicon carbide that results in excellent figure control, with the higher pliability of silicon that results in an impoved enterinment of the abrasive particles 21, while avoiding the detrimental effects of such materials.

While the present invention has been illustrated and described as embodied in a particular construction of a silicon carbide/silicon composite lap for use in free abrasive grinding, it will be appreciated that the present invention is not limited to this particular example; rather, the scope of protection of the present invention is to be determined solely from the attached claims.

We claim:

1. A method of manufacturing a composite yet monolithic, free abrasive grinding lap, comprising the steps of
    forming an initial preform, including filling a mold cavity with a dense slip constituted of ceramic or metal particles in mixture with a liquid medium;
    freezing the initial preform;
    freeze-drying the initial preform to remove the liquid medium therefrom;
    sintering the thus obtained dry preform only to such an extent that the larger ones of the particles are fused together but leave interconnected pores therebetween; and
    converting the thus obtained porous matrix preform into the lap, including bringing the porous matrix preform to a temperature above the melting point of silicon, and contacting the porous matrix preform with a quantity of molten silicon in such a manner that such molten silicon penetrates into the pores of the porous matrix preform at least to an extent needed to substantially completely fill the pores of an effective region of the lap that is to come in contact with a workpiece to be acted upon by the lap.

2. A composite yet monolithic free abrasive grinding lap, obtained by a method comprising the steps of
    forming an initial preform, including filling a mold cavity with a dense slip consisting of ceramic or metal particles in mixture with a liquid medium;
    freezing the initial preform;
    freeze-drying the initial preform to remove the liquid medium therefrom;
    sintering the thus obtained dry preform only to such an extent that the larger ones of the particles are fused together but leave interconnected pores therebetween; and converting the thus obtained porous matrix preform into the lap, including bringing the porous matrix preform to a temperature above the melting point of silicon, and contacting the porous matrix preform with a quantity of molten silicon in such a manner that such molten silicon penetrates into the pores of the porous matrix preform at least to an extent needed to substantially completely fill the pores of an effective region of the lap that is to come in contact with a workpiece to be acted upon by the lap.

3. A composite yet monolithic, free abrasive grinding lap, comprising
 a sintered porous matrix of ceramic or metal material; and
 a quantity of silicon substantially completely filling the pores of the sintered porous matrix preform at least throughout an effective region of the lap that is to come in contact with a workpiece to be acted upon by the lap.

* * * * *